(12) United States Patent
O'Riordan et al.

(10) Patent No.: US 11,914,904 B2
(45) Date of Patent: *Feb. 27, 2024

(54) AUTONOMOUS STORAGE PROVISIONING

(71) Applicant: EMC IP Holding Company LLC, Hopkinton, MA (US)

(72) Inventors: Finbarr O'Riordan, Cork (IE); Tim O'Connor, Farnanes (IE)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/078,400

(22) Filed: Dec. 9, 2022

(65) Prior Publication Data
US 2023/0108360 A1   Apr. 6, 2023

Related U.S. Application Data

(63) Continuation of application No. 17/381,329, filed on Jul. 21, 2021, now Pat. No. 11,614,900.

(51) Int. Cl.
*G06F 3/06* (2006.01)

(52) U.S. Cl.
CPC .......... *G06F 3/0665* (2013.01); *G06F 3/0604* (2013.01); *G06F 3/062* (2013.01); *G06F 3/0631* (2013.01); *G06F 3/067* (2013.01); *G06F 3/0683* (2013.01)

(58) Field of Classification Search
CPC ...... G06F 3/0665; G06F 3/0604; G06F 3/062; G06F 3/0631; G06F 3/067; G06F 3/0683
See application file for complete search history.

(56) References Cited

U.S. PATENT DOCUMENTS

| | | | |
|---|---|---|---|
| 8,566,546 B1 * | 10/2013 | Marshak | G06F 3/0689 711/112 |
| 9,971,548 B1 * | 5/2018 | Talwar | G06F 3/0613 |
| 2003/0149695 A1 * | 8/2003 | Delaire | G06Q 20/40 |
| 2005/0027938 A1 * | 2/2005 | Burkey | G06F 3/0662 711/170 |
| 2005/0228945 A1 * | 10/2005 | Nagata | G06F 3/0644 711/170 |

(Continued)

*Primary Examiner* — Ryan Bertram
(74) *Attorney, Agent, or Firm* — Muirhead and Saturnelli, LLC

(57) ABSTRACT

Techniques for provisioning storage may include: initially provisioning storage for a storage group of logical devices; tagging the storage group to enable autonomous storage provisioning; receiving a plurality of parameters used in connection with performing autonomous storage provisioning for the storage group, wherein the plurality of parameters includes a first parameter denoting a threshold amount of consumed storage of the storage group, a second parameter denoting a storage capacity expansion amount by which to expand the storage capacity of the storage group, and a third parameter denoting a system-wide threshold of consumed backend non-volatile storage; determining, in accordance with the plurality of parameters, whether to expand a current storage capacity of the storage group; and responsive to determining to expand the current storage capacity of the storage group, performing first processing to automatically expand the current storage capacity of the storage group in accordance with the second parameter.

15 Claims, 7 Drawing Sheets

(56) References Cited

U.S. PATENT DOCUMENTS

| | | | |
|---|---|---|---|
| 2007/0168634 A1* | 7/2007 | Morishita | G06F 3/0665 |
| | | | 711/170 |
| 2007/0283089 A1* | 12/2007 | Tsurudome | G06F 3/067 |
| | | | 711/170 |
| 2012/0096235 A1* | 4/2012 | Lehr | G06F 3/067 |
| | | | 711/E12.001 |
| 2014/0047208 A1* | 2/2014 | Morse | G06F 3/0605 |
| | | | 711/E12.078 |
| 2014/0351808 A1* | 11/2014 | Srinivasan | G06F 3/067 |
| | | | 718/1 |
| 2015/0381453 A1* | 12/2015 | Skjolsvold | G06F 9/505 |
| | | | 709/224 |
| 2020/0027014 A1* | 1/2020 | Wen | G06F 9/5077 |
| 2021/0349657 A1* | 11/2021 | Darji | G06F 3/0679 |
| 2022/0283716 A1* | 9/2022 | Shilane | G06F 3/0653 |

* cited by examiner

AUTONOMOUS STORAGE PROVISIONING

BACKGROUND

Technical Field

This application generally relates to data storage.

Description of Related Art

Data storage systems (often referred to herein simply as "storage systems") may include storage resources used by one or more host systems (sometimes referred to herein as "hosts") to store data. One or more storage systems and one or more host systems may be interconnected by one or more network components, for example, as part of a switching fabric, to form a data storage network (often referred to herein simply as "storage network"). Storage systems may provide any of a variety of data services to host systems of the storage network.

A host system may host applications that utilize the data services provided by one or more storage systems of the storage network to store data on the physical storage devices (e.g., tape, disks or solid state devices) thereof. For a given application, to perform I/O operations utilizing a physical storage device of the storage system, one or more components of the host system, storage system and network components therebetween may be used. Each of the one or more combinations of these components over which I/O operations between an application and a physical storage device can be performed may be considered an I/O path between the application and the physical storage device. These I/O paths collectively define a connectivity of the storage network.

SUMMARY OF THE INVENTION

Various embodiments of the techniques herein may include a method, a system and a computer readable medium for provisioning storage comprising: initially provisioning storage for a storage group of logical devices; tagging the storage group to enable autonomous storage provisioning for the storage group; receiving a plurality of parameters used in connection with performing autonomous storage provisioning for the storage group, wherein the plurality of parameters includes a first parameter denoting a threshold amount of consumed storage of the storage group, a second parameter denoting a storage capacity expansion amount by which to expand the storage capacity of the storage group, and a third parameter denoting a system-wide threshold of consumed backend non-volatile storage; determining, in accordance with the plurality of parameters, whether to expand a current storage capacity of the storage group; and responsive to determining to expand the current storage capacity of the storage group, performing first processing to automatically expand the current storage capacity of the storage group in accordance with the second parameter.

In at least one embodiment, processing may include: determining whether the current amount of consumed storage of the storage group exceeds the threshold amount of consumed storage denoted by the first parameter; and responsive to determining the current amount of consumed storage of the storage group does not exceed the threshold amount of consumed storage denoted by the first parameter, determining not to expand the current storage capacity of the storage group. Responsive to determining the current amount of consumed storage of the storage group does exceed the threshold amount of consumed storage denoted by the first parameter, second processing may be performed. The second processing may include: determining, in accordance with the second parameter, a second amount by which to increase the current storage capacity of the storage group; determining whether allocating the second amount of storage capacity results in a current amount of consumed backend non-volatile storage exceeding the system-wide threshold of consumed backend non-volatile storage denoted by the third parameter; and responsive to determining that allocating the second amount of storage capacity results in the current amount of consumed backend non-volatile storage exceeding the system-wide threshold of consumed backend non-volatile storage denoted by the third parameter, determining not to expand the current storage capacity of the storage group.

In at least one embodiment, processing performed may include responsive to determining that allocating the second amount of storage capacity does not result in the current amount of consumed backend non-volatile storage exceeding the system-wide threshold of consumed backend non-volatile storage denoted by the third parameter, determining to expand the current storage capacity of the storage group. Performing first processing to automatically expand the current storage capacity of the storage group in accordance with the second parameter may include: determining, in accordance with the second parameter, a second amount by which to increase the current storage capacity of the storage group; and increasing the current storage capacity of the storage group by the second amount.

In at least one embodiment, increasing the current storage capacity of the storage group by the second amount may include adding a plurality of logical devices to the storage group, wherein the total storage capacity of the plurality of devices added to the storage group is equal to the second amount. Each of the plurality of logical devices added to the storage group may be configured to have local replication protection in accordance with a defined local replication policy of the storage group. Each of the plurality of logical devices added to the storage group may be configured to have remote replication protection in accordance with a defined remote replication policy of the storage group.

In at least one embodiment, the first parameter may be expressed using a percentage value denoting a percentage of the current storage capacity of the storage group. The first parameter may be expressed as an integer or numeric value denoting an amount of storage. The second parameter may be expressed as a percentage value denoting a percentage of the current storage capacity of the storage group. The second parameter may be expressed as an integer or numeric value denoting an amount of storage. The third parameter may be expressed as a percentage value denoting a percentage of a current back end non-volatile storage capacity in a data storage system including the storage group.

In at least one embodiment, the storage group may be one of a plurality of storage groups in a data storage system and wherein a selected portion of the plurality of storage groups may be tagged to enable autonomous storage provisioning for the selected portion of the plurality of storage groups. A second storage group of the plurality of storage groups not included in the selected portion may not be tagged whereby autonomous storage provisioning is disabled for the second storage group. The second storage group may include data that is not as important or critical as other data of the storage group. The storage group may include data used by a first application and the second storage group may include data used by a second application, wherein the first application may be more important or critical than the second application

BRIEF DESCRIPTION OF THE DRAWINGS

Features and advantages of the present invention will become more apparent from the following detailed description of illustrative embodiments thereof taken in conjunction with the accompanying drawings in which.

DETAILED DESCRIPTION OF EMBODIMENTS

A storage system may have a plurality of physically discrete computing modules (hereinafter "computing modules") interconnected by an internal switching fabric of the storage system. For example, a computing module may be a director board of a PowerMax™ data storage system made available from Dell EMC. Each computing module may have its own dedicated local memory and a global memory (GM) segment that is a portion of a distributed GM shared by multiple (e.g., all) computing modules. Each computing module may include one or more central processing units (CPUs). In at least one embodiment, each of the CPUs may be a multi-core CPU including multiple processing cores or processors. The individual cores or processors within a single CPU can execute multiple instruction streams in parallel thereby increasing the performance of software which has been written to take advantage of the unique architecture. In at least one embodiment, one or more of the CPUs may be configured (e.g., hardwired, hardcoded or programmed) as a functional component of a storage system, for example, a front-end adapter (FA), or back-end adapter (BEA) as described in more detail herein, or as some other functional component, for example, an extended data services component (EDS) responsible for one or more data services, e.g., memory management for I/O operations.

Figure 1:
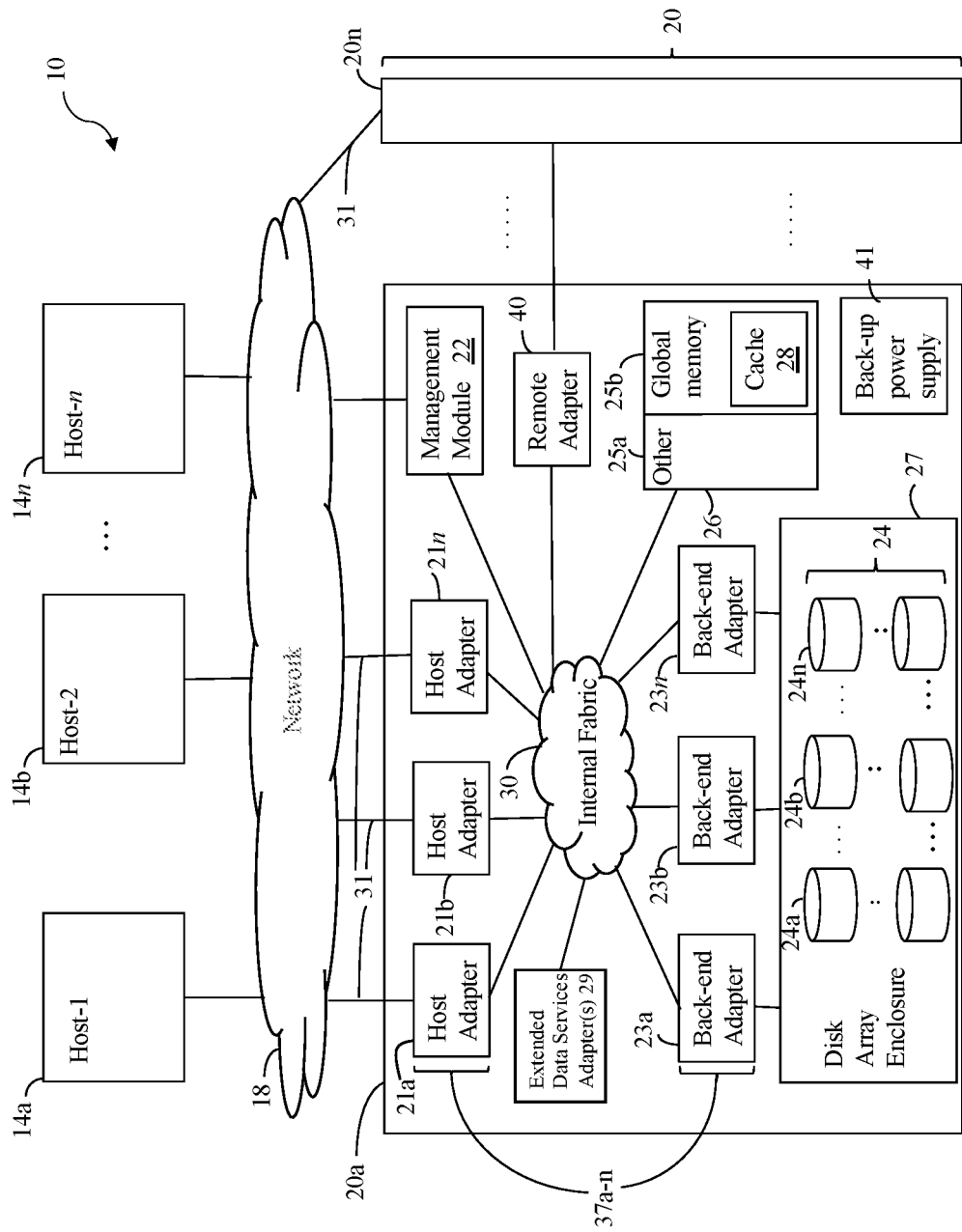
FIGS. 1 and 3 are diagrams illustrating examples of a data storage network in an embodiment in accordance with the techniques herein.

FIG. 1 illustrates an example of an embodiment of a data storage network 10 (often referred to herein as a "storage network"). The storage network 10 may include any of: host systems (i.e., "hosts") 14a-n; network 18; one or more storage systems 20a-n; other components; or any suitable combination of the foregoing. The storage systems 20a-n, connected to the host systems 14a-n through the network 18, may collectively constitute a distributed storage system 20. All of the host computers 14a-n and the storage systems 20a-n may be located at the same physical site, or, alternatively, two or more host computers 14a-n and/or storage systems 20a-n may be located at different physical locations. The storage network 10 or portions thereof (e.g., one or more storage systems 20a-n in combination with network 18) may be any of a variety of types of storage networks, such as, for example, a storage area network (SAN), e.g., of a data center. Embodiments of the techniques described herein are in reference to the storage system 20a, but it should be appreciated that such embodiments may be implemented using other discrete storage systems (e.g., storage system 20n), alone or in combination with storage system 20a.

The N hosts 14a-n may access the storage system 20a, for example, in performing input/output (I/O) operations or data requests, through the network 18. For example, each of the hosts 14a-n may include one or more host bus adapters (HBAs) (not shown) that each include one or more host ports for connecting to the network 18. The network 18 may include any one or more of a variety of communication media, switches and other components known to those skilled in the art, including, for example: a repeater, a multiplexer or even a satellite. Each communication medium may be any of a variety of communication media including, but not limited to: a bus, an optical fiber, a wire and/or other type of data link, known in the art. The network 18 may include at least a portion of the Internet, or a proprietary intranet, and components of the network 18 or components connected thereto may be configured to communicate in accordance with any of a plurality of technologies, including, for example: SCSI, ESCON, Fibre Channel (FC), iSCSI, FCoE, GIGE (Gigabit Ethernet), NVMe (Non-volatile Memory Express) over Fabric (NVMe-of); other technologies, or any suitable combinations of the foregoing, each of which may have one or more associated standard specifications. In some embodiments, the network 18 may be, or include, a storage network fabric including one or more switches and other components. A network located externally to a storage system that connects host systems to storage system resources of the storage system, may be referred to herein as an "external network."

Each of the host systems 14a-n and the storage systems 20a-n included in the storage network 10 may be connected to the network 18 by any one of a variety of connections as may be provided and supported in accordance with the type of the network 18. The processors included in the host computer systems 14a-n may be any one of a variety of proprietary or commercially available single or multi-processor system, such as an Intel-based processor, or other type of commercially available processor able to support traffic in accordance with each particular embodiment and application. Each of the host computer systems may perform different types of I/O operations in accordance with different tasks and applications executing on the hosts. In the embodiment of FIG. 1, any one of the host computers 14a-n may issue an I/O request to the storage system 20a to perform an I/O operation. For example, an application executing on one of the host computers 14a-n may perform a read or write operation resulting in one or more I/O requests being transmitted to the storage system 20a.

Each of the storage systems 20a-n may be manufactured by different vendors and interconnected (not shown). Additionally, the storage systems 20a-n also may be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by each of the host computer systems 14a-n, for example, to the storage systems 20a-20n.

It should be appreciated that the particulars of the hardware and software included in each of the components that may be included in the storage systems 20a-n are described herein in more detail, and may vary with each particular embodiment.

Each of the storage systems, such as 20a, may include a plurality of physical storage devices 24 (e.g., physical non-volatile storage devices) such as, for example, disk devices, solid-state storage devices (SSDs, e.g., flash, storage class memory (SCM), NVMe SSD, NVMe SCM) or even magnetic tape, and may be enclosed within a disk array enclosure (DAE) 27. In some embodiments, two or more of the physical storage devices 24 may be grouped or arranged together, for example, in an arrangement consisting of N rows of physical storage devices 24a-n. In some embodiments, one or more physical storage devices (e.g., one of the rows 24a-n of physical storage devices) may be connected to a back-end adapter ("BEA") (e.g., a director configured to serve as a BEA) responsible for the backend management of operations to and from a portion of the physical storage devices 24. A BEA is sometimes referred to by those in the art as a disk adapter ("DA") because of the development of such adapters during a period in which disks were the dominant type of physical storage device used in storage systems, even though such so-called DAs may be configured to manage other types of physical storage devices (e.g., SSDs). In the system 20a, a single BEA, such as 23a, may be responsible for the management of one or more (e.g., a row) of physical storage devices, such as row 24a. That is, in some configurations, all I/O communications with one or more physical storage devices 24 may be controlled by a specific BEA. The BEAs 23a-n may employ one or more technologies in communicating with, and transferring data to/from, physical storage devices 24, for example, SAS, SATA or NVMe. For NVMe, to enable communication between each BEA and the physical storage devices that it controls, the storage system may include a PCIe switch for each physical storage device controlled by the BEA; i.e., connecting the physical storage device to the controlling BEA.

It should be appreciated that the physical storage devices are not limited to being arranged in rows. Further, the DAE 27 is not limited to enclosing disks, as the name may suggest, but may be constructed and arranged to enclose a plurality of any type of physical storage device, including any of those described herein, or combinations thereof.

The system 20a also may include one or more host adapters ("HAs") 21a-n, which also may be referred to herein as front-end adapters ("FAs") (e.g., directors configured to serve as FAs). Each of these FAs may be used to manage communications and data operations between one or more host systems and GM 25b of memory 26. The FA may be, or include, a Fibre Channel (FC) adapter if FC is a technology being used to communicate between the storage system 20a and the one or more host systems 14a-n, or may be another type of adapter based on the one or more technologies being used for I/O communications.

Also shown in the storage system 20a is a remote adapter ("RA") 40. The RA may be, or include, hardware that includes a processor used to facilitate communication and data exchanges between storage systems (e.g., 20a and 20n), such as between two of the same or different types of storage systems, and/or may be implemented using a director.

The storage system 20a also may include one or more extended data service adapters 29 (EDSs) which are directors configured to serve as EDSs. An EDS may perform various data services, for example, including such services or processing in connection with facilitating other processing performed by BEAs and FAs. For example, an EDS may perform processing that manages metadata tables of information used by other directors such as BEAs in connection with I/O operations, data deduplication, and the like.

The storage system 20a also may include a management module 22, which may be configured (e.g., dedicated) to performing storage management functions or services such as, for example, storage provisioning, device configuration, tier management, other services, or any combination of other services. The management module may be configured to be accessed by only certain personnel (e.g., storage administrators, support engineers) and may have its own dedicated hardware, firmware, software, CPU resources and OS, and may be loaded with one or more applications, tools, CLIs (command line interfaces), APIs (application programming interfaces), and the like, to enable management. In some embodiments, the management module, or portions thereof, may be located external to storage system 20a, for example, as part of one of host systems 14a-n or another separate system connected to the storage system 20a via the network 18.

The FAs, BEAs, EDSs and RAs may be collectively referred to herein as directors 37a-n. Each director 37a-n may include a processing core including compute resources, for example, one or more CPUs cores and/or a CPU complex for processing I/O operations, and may be implemented on a circuit board, as described in more detail elsewhere herein. There may be any number of directors 37a-n, which may be limited based on any of a number of factors, including spatial, computation and storage limitations. In an embodiment disclosed herein, there may be up to sixteen directors coupled to the memory 26. Other embodiments may use a higher or lower maximum number of directors.

The system 20a also may include an internal switching fabric (i.e., internal fabric) 30, which may include one or more switches, that enables internal communications between components of the storage system 20a, for example, the directors 37a-n (FAs 21a-n, BEAs 23a-n, EDSs 29, RA 40, management module 22) and the memory 26, e.g., to perform I/O operations. One or more internal logical communication paths may exist between the directors and the memory 26, for example, over the internal fabric 30. For example, any of the directors 37a-n may use the internal fabric 30 to communicate with other directors to access any of physical storage devices 24; i.e., without having to use memory 26. In addition, one of the directors 37a-n may be able to broadcast a message to all of the other directors 37a-n over the internal fabric 30 at the same time. Each of the components of system 20a may be configured to communicate over internal fabric 30 in accordance with one or more technologies such as, for example, InfiniBand (IB), Ethernet, Gen-Z, another technology, or any suitable combination of the foregoing.

The GM portion 25b may be used to facilitate data transfers and other communications between the directors 37a-n in a storage system. In one embodiment, the directors 37a-n (e.g., serving as FAs, EDSs, or BEAs) may perform data operations using a cache 28 that may be included in the GM 25b, for example, in communications with other directors, and other components of the system 20a. The other portion 25a is that portion of memory that may be used in connection with other designations that may vary in accordance with each embodiment. The GM 25b and the cache 28 are described in more detail elsewhere herein. It should be appreciated that, although the memory 26 is illustrated in FIG. 1 as being a single, discrete component of storage system 20a, the techniques herein are not so limited. In some embodiments, memory 26, or the GM 25b or the other memory 25a thereof, may be distributed among a plurality of circuit boards (i.e., "boards"), as described in more detail elsewhere herein.

In at least one embodiment, write data received at the storage system from a host or other client may be initially written to the cache 28 and marked as write pending (WP). For example, the cache 28 may be partitioned into one or more portions called cache slots, which may be a of a predefined uniform size, for example, 128 Kbytes. Write data of a write operation received at the storage system may be initially written (i.e., staged) in one or more of these cache slots and marked as write pending. Once written to the cache 28, the host (e.g., one of 14a-n) may be notified that the write operation has completed. At a later time, the write data may be de-staged from the cache 28 to one or more physical storage devices 24a-n, such as by a BEA.

When the data storage system receives a read I/O operation from the host, the data storage system may determine whether the requested read data needed to service the read I/O operation is in the cache 28. If so, processing determines a read cache hit has occurred whereby the requested read data is retrieved from the cache and returned to the host. If the requested read data is not in the cache, processing determines that a read cache miss has occurred. Responsive to the read cache miss occurring, the requested read data is retrieved from the BE PDs providing the non-volatile BE storage and stored in the cache. Subsequently, the read data (now stored in the cache) is read from the cache and returned to the requesting host.

It should be noted that, although examples of techniques herein may be made with respect to a physical storage system and its physical components (e.g., physical hardware for each RA, EDS, BEA, FA and the like), the techniques herein may be performed in a physical storage system including one or more emulated or virtualized components (e.g., emulated or virtualized ports, emulated or virtualized EDSs, BEAs or FAs), and also a virtualized or emulated storage system including virtualized or emulated components. For example, in embodiments in which NVMe technology is used to communicate with, and transfer data between, a host system and one or more FAs, one or more of the FAs may be implemented using NVMe technology as an emulation of an FC adapter.

The storage system 20a may include a back-up power supply 41 (e.g., a battery) that can provide power to the storage system for a limited amount of time to after primary (AC) power fails. This limited time may allow certain tasks to be performed during a window time beginning when the primary power fails until the earliest of: the primary power is restored; and the end of the limited lifetime (sometimes on the order of second or tens of seconds) of the back-up power supply. For example, during this window of time, the contents of the cache 28 may be de-staged to one or more physical storage devices.

Any of the storage systems 20a-n, or one or more components thereof, described in relation to FIGS. 1-2 may be implemented using one or more Symmetrix®, VMAX®, VMAX3® or PowerMax™ systems made available from Dell EMC (elsewhere referred to herein collectively as PowerMax Systems).

The host systems 14a-n may provide data and control (e.g., management and access control) information to the storage systems 20a-n over a plurality of I/O paths defined between the host systems and the storage systems, for example, including host system components, storage system components, and network components (e.g., of network 18), and the storage systems also may provide data to the host systems across the I/O paths. In the embodiment of FIG. 1, the host systems may not address the physical storage devices (e.g., disk drives or flash drives) 24 of the storage systems directly. Rather access to data may be provided to one or more host systems from what the host systems view as a plurality of logical storage units (LSUs) including, for example, a logical volume, logical block, LUN (i.e., logical device or logical disk), thin or virtually provisioned device, groups of logical devices (e.g., storage group), NVMe namespace, and other types of LSUs. For example, a PowerMax storage system may be configured to organize available storage resources (e.g., physical storage devices) into many LUNs, each with its own addressable space defined in logical blocks addresses (LBAs). The LSUs may or may not correspond to the actual physical storage devices. For example, one or more LSUs may map to a single physical storage device; that is, the logical address space of the one or more LSU may map to physical space on a single physical storage device. Data in a single storage system may be accessed by multiple hosts allowing the hosts to share the data residing therein. The FAs may be used in connection with communications between a storage system and a host system. The RAs may be used in facilitating communications between two storage systems. The BEAs may be used in connection with facilitating communications to the associated physical storage device(s) based on LSU(s) mapped thereto.

Figure 2A:
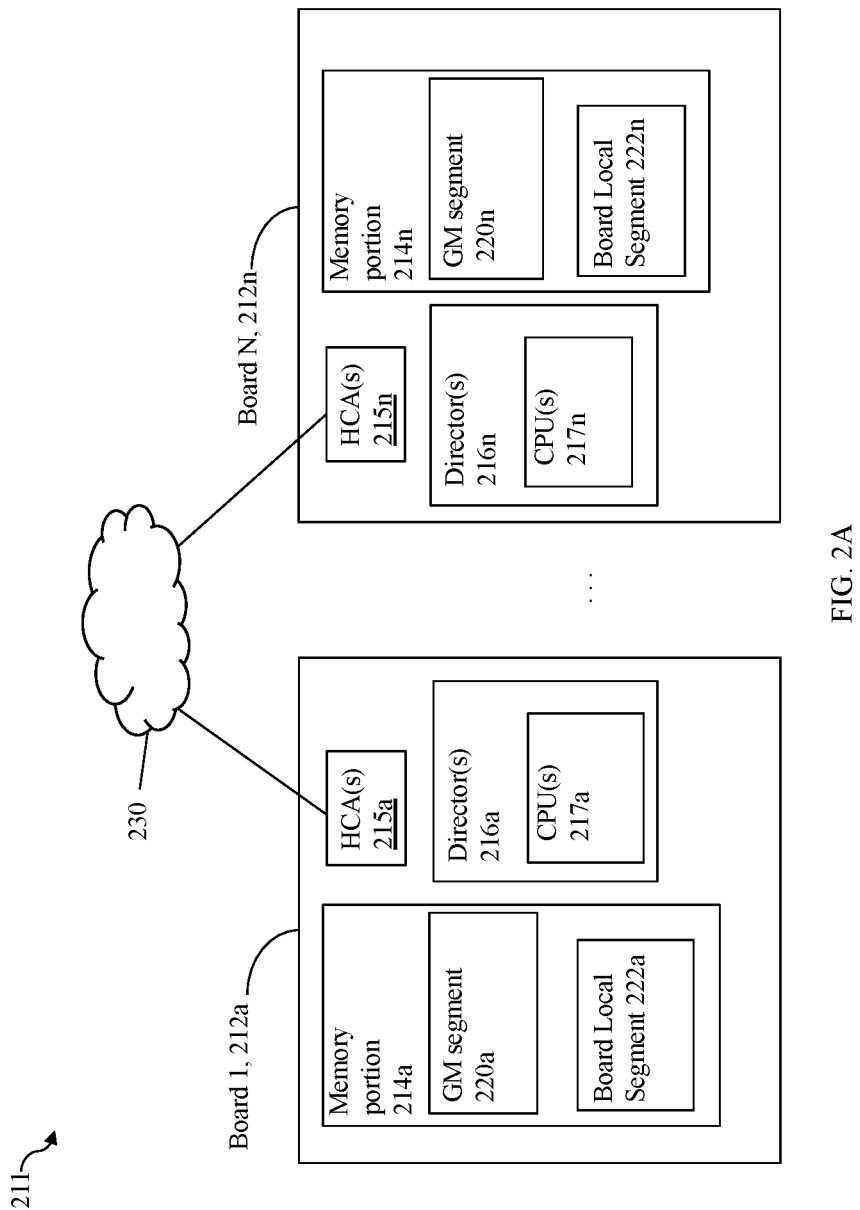
FIG. 2A is a block diagram illustrating an example of a storage system including multiple circuit boards in an embodiment in accordance with the techniques herein.

FIG. 2A is a block diagram illustrating an example of at least a portion 211 of a storage system (e.g., 20a) including multiple boards 212a-212n. The storage system 211 may include a plurality of boards 212a-212n and a fabric 230 (e.g., internal fabric 30) over which the boards 212a-n may communicate. Each of the boards 212a-212n may include components thereon as illustrated. The fabric 230 may include, for example, one or more switches and connections between the switch(es) and boards 212a-212n. In at least one embodiment, the fabric 230 may be an IB fabric.

In the following paragraphs, further details are described with reference to board 212a but each of the N boards in a system may be similarly configured. For example, the board 212a may include one or more directors 216a (e.g., directors 37a-n) and memory portion 214a. The one or more directors 216a may include one or more CPUs 217a including compute resources, for example, one or more cores or processing units and/or a CPU complex for processing I/O operations. One or more of the CPUs may be configured to function as one of the directors 37a-n described herein. For example, element 216a of board 212a may be configured to operate, such as by executing code, as any one or more of an FA, BEA, RA, and the like. In at least one embodiment, each of the directors may include a multicore CPU.

Each of the boards 212a-n may include one or more host channel adapters (HCAs) 215a-n, respectively, that physically couple, and are configured to enable communication between, the boards 212a-n, respectively, and the fabric 230. In some embodiments, the fabric 230 may include multiple (e.g., 2) switches, and each HCA 215a-n may have multiple (e.g., 2) ports, each one connected directly to one of the switches.

Each of the boards 212a-n may, respectively, also include memory portions 214a-n. The memory portion of each board may be characterized as locally accessible with respect to that particular board and with respect to other components on the same board. For example, the board 212a includes the memory portion 214a which is memory that is local to that particular the board 212a. Data stored in the memory portion 214a may be directly accessed by a CPU or core of a director 216a of the board 212a. For example, the memory portion 214a may be a fast memory (e.g., DIMM (dual inline memory module) DRAM (dynamic random access memory)) that is locally accessible by a director 216a where data from one location in 214a may be copied to another location in 214a directly using DMA (direct memory access) operations (e.g., local memory copy operations) issued by the director 216a. Thus, the director 216a may directly access data of 214a locally without communicating over the fabric 230.

The memory portions 214a-214n of the boards 212a-n may be further partitioned into different portions or segments for different uses. For example, each of the memory portions 214a-214n may respectively include the GM segments 220a-n configured for collective use as segments of a distributed GM. Thus, data stored in any GM segment 220a-n may be accessed by any director 216a-n on any board 212a-n. Additionally, each of the memory portions 214a-n may respectively include the board local segments 222a-n. Each of the board local segments 222a-n are respectively configured for use locally by the one or more directors 216a-n, and possibly other components, residing on the same single board. In at least one embodiment where there is a single director denoted by 216a (and generally by each of 216a-n), data stored in the board local segment 222a may be accessed by the respective single director 216a located on the same board 212a. However, the remaining directors located on other ones of the N boards may not access data stored in the board local segment 222a.

To further illustrate, the GM segment 220a may include information such as user data stored in the data cache, metadata, and the like, that is accessed (e.g., for read and/or write) generally by any director of any of the boards 212a-n. Thus, for example, any director 216a-n of any of the boards 212a-n may communicate over the fabric 230 to access data in GM segment 220a. In a similar manner, any director 216a-n of any of the boards 212a-n may generally communicate over fabric 230 to access any GM segment 220a-n comprising the GM. Although a particular GM segment, such as 220a, may be locally accessible to directors on one particular board, such as 212a, any director of any of the boards 212a-n may generally access the GM segment 220a. Additionally, the director 216a may also use the fabric 230 for data transfers to and/or from GM segment 220a even though 220a is locally accessible to director 216a (without having to use the fabric 230).

Also, to further illustrate, the board local segment 222a may be a segment of the memory portion 214a on the board 212a configured for board-local use solely by components on the single/same board 212a. For example, the board local segment 222a may include data which is used and accessed only by the directors 216a included on the same board 212a as the board local segment 222a. In at least one embodiment in accordance with the techniques herein, each of the board local segments 222a-n may include a local page table or page directory used, respectively, by only director(s) 216a-n local to each of the boards 212a-n.

In such an embodiment as in FIG. 2A, the GM segments 220a-n may be logically concatenated or viewed in the aggregate as forming one contiguous GM logical address space of a distributed GM. In at least one embodiment, the distributed GM formed by GM segments 220a-n may include the data cache, various metadata and/or structures, and other information, as described in more detail elsewhere herein. Consistent with discussion herein, the data cache, having cache slots allocated from GM segments 220a-n, may be used to store I/O data (e.g., for servicing read and write operations).

Figure 2B:
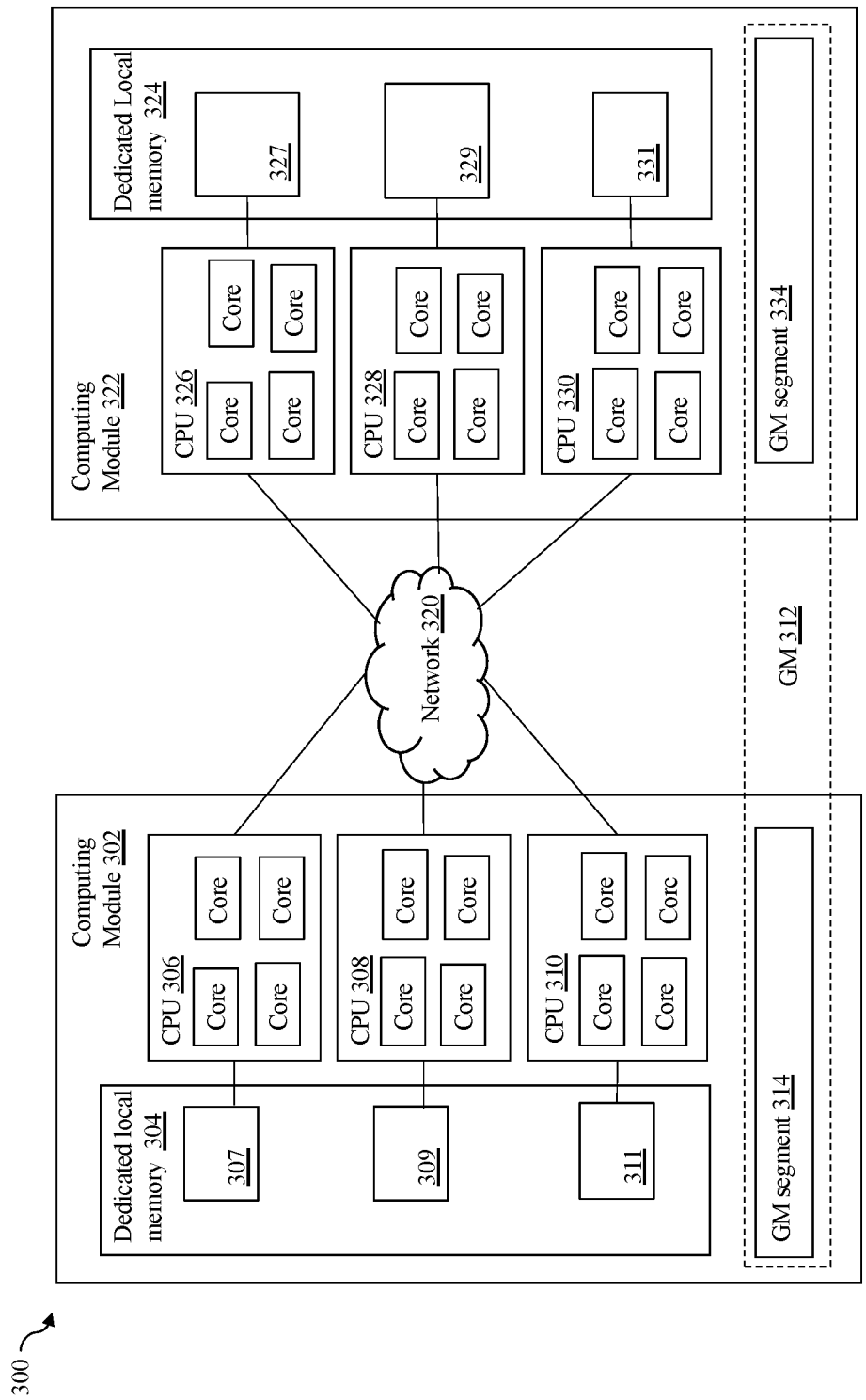
FIG. 2B is a block diagram illustrating an example of a storage system including multiple computing modules and processing cores in an embodiment in accordance with the techniques herein.

FIG. 2B is a block diagram illustrating an example of a storage system 300 including multiple computing modules and CPUs in an embodiment in accordance with the techniques herein. Other embodiments of a storage system including multiple computing modules and CPUs, for example, variations of the storage system 300, are possible and are intended to fall within the scope of embodiments of the techniques herein. The storage system 300 may be a variation of the storage system 211 and may include any of the functionality and/or component described above in relation to storage systems 211 and/or 20a.

Figure 3:
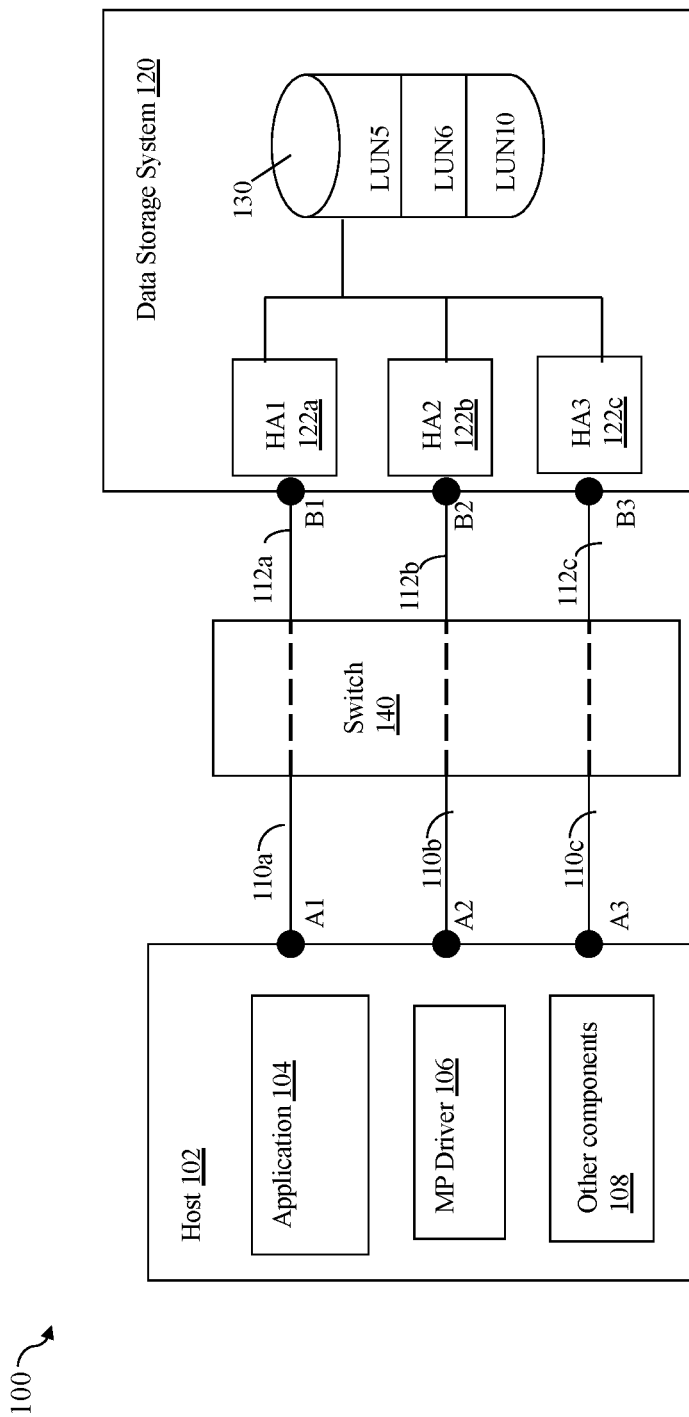

The storage system 300 may include multiple computing modules, including computing modules 302 and 322. It should be appreciated that the storage system may include more than two computing modules. Each of computing modules 302 and 322 may be a director board of a PowerMax system made available from Dell EMC. Each of the computing modules 302 and 322 may include generally one or more CPUs, where each CPU may be a single core or multi-core CPU. For example, the computing module 302 may include the CPUs 306, 308 and 310; and the computing module 322 may include the CPUs 326, 328 and 330. Each CPU may generally include one or more processing units or cores, each of which may be capable of processing a separate instruction stream. As a variation and as illustrated in the embodiment of FIG. 2B, for example, each CPU may include a plurality of processing cores, including a number other than four as illustrated in FIG. 3. In at least one embodiment, each of the CPUs 306, 308, 310, 326, 328 and 330 may be configured (e.g., hardwired, hardcoded or programmed) as a functional component or director of a storage system, for example, an FA, BEA or EDS. More generally, one or more of the CPUs 306, 308, 310, 326, 328 and 330 may be configured (e.g., hardwired, hardcoded or programmed) as a functional component of a storage system, for example, an FA, BEA or EDS.

Each of the computing modules 302, 322 may include, respectively, dedicated local memory 304, 324 dedicated to the computing module. Each of the dedicated local memories 304, 324 may be an implementation of a board local segment, such as the board local segment 222a described in relation to the storage system 211 of FIG. 2A. Further each of the CPUs 306, 308 and 310 may be allocated a portion of the local memory 304 for exclusive or private use by the single CPU. For example, the memory portions 307, 309 and 311 may be configured for exclusive or private use, respectively, by the CPUs 306, 308 and 310; and the memory portions 327, 329 and 331 may be configured for exclusive or private use, respectively, by the CPUs 326, 328 and 330.

In at least one embodiment in accordance with the techniques herein, some or all of a local memory portion designated for exclusive private use by a single CPU may be used as a local cache by the CPU. For example, the memory portion 307 may denote a portion of the dedicated local memory 304 designated as a local or private cache of the CPU 306, the memory portion 309 may denote a portion of the dedicated local memory 304 designated as a local or private cache of the CPU 308, and the memory portion 311 may denote a portion of the dedicated local memory 304 designated as a local or private cache of the CPU 310. Additionally, the memory portion 327 may denote a portion of the dedicated local memory 324 designated as a local or private cache of the CPU 326, the memory portion 329 may denote a portion of the dedicated local memory 324 designated as a local or private cache of the CPU 328, and the memory portion 331 may denote a portion of the dedicated local memory 324 designated as a local or private cache of the CPU 330.

The memory portions denoting the CPU local or private caches 307, 309, 311, 327, 329 and 331 may be configured to store values or data items used solely be each associated CPU.

The GM segment 314 may be a shared portion of a distributed GM 312. Distributed GM 312 may include a GM segment 334 of a computing module 322. The computing module 322 may be connected to the computing module 302 by an internal fabric 320

In at least one embodiment in which each CPU may include multiple processing units or cores and multiple processes may be executing simultaneously on the processing units or cores of the single CPU, processing may be performed to synchronize access to the CPU's local or private resources among the different cores of the single CPU using such resources. For example, in at least one embodiment as described above and illustrated in the FIG. 2B, each CPU may use a local or private cache configured out of the dedicated local memory (e.g., local to a single computing module or board including the processor code). In such an embodiment, any suitable synchronization technique or mechanism may be used to provide exclusive serial access, when needed, to a location or data value in each of the memory portions 307, 309, 311, 327, 329 and 331 used by the multiple cores or processing units in a single CPU. For example, a synchronization technique may be used to synchronize access to locations of the private cache 307 used by the multiple cores of the CPU 306; a synchronization technique may be used to synchronize access to locations of the private cache 309 used by the multiple cores of the CPU 308; and so on, for each of the other multicore CPUs 310, 326, 328 and 330.

As a variation, each CPU 306, 308, 310, 326, 328, 330 may rather be characterized as a processor rather than a multi-core CPU. In this case in which the CPU is rather a single processor or processing unit, there is no contention for locally used resources among multiple cores of the same CPU. In the embodiment in which the CPU is a single core or processing unit, no synchronization technique or mechanism is necessary when accessing, for example, the portions of the private cache of a single CPU. For example, if 306 denotes only a single core or processing unit CPU, then no synchronization technique or mechanism is necessary when accessing, for example, the portions of the private cache or memory 307 used exclusively by the single CPU 306.

Although not explicitly illustrated in FIG. 2B, those CPUs configured as FAs also have the necessary front end interfaces to the network, such as the network 18 of FIG. 1, to communication with external clients such as the hosts. Also, although not explicitly illustrated in FIG. 2B, those CPUs configured as BEAs also have the necessary backend interfaces, such as interfaces to the various backend (BE) non-volatile physical storage devices (PDs) 24 of FIG. 1, to read data from, and write data to, such PDs.

In at least one embodiment in accordance with the techniques herein, a data storage system may provide different data replication technologies, facilities or services. Such replication technologies may be characterized as local or remote. Additionally, a replication technology may provide for creating a complete, physical bit for bit copy or replica of data (that is local and/or remote). A replication technology may provide for creating a logical or virtual point in time copy of a data source such as using a snapshot technology or facility known in the art. Such logical copies of a data source are not a complete physical copy of the data source. Rather, different techniques such as a snapshot technique may be used to create a logical or virtual copy of the data source. For example, a snapshot facility may be used in an embodiment in accordance with techniques herein to create a snapshot characterized as a logical point in time copy of data. In connection with a logical device, or more generally any storage entity, software of a data storage system may provide one or more data replication services or facilities whereby a snapshot is one such facility that may be used to create point in time snapshot of a logical device such as a LUN for non-disruptive backup. A snapshot may appear like a normal logical device and may be used for backup, testing, and the like.

Snapshots may rely, for example, on copy on first write (COFW) and other techniques to track source logical device changes from the time when a snapshot was created. Any writes to the source logical device may result in processing by snapshot software, for example, to copy the original data prior to changes into another area of storage before overwriting the source logical device location with the newly written data (e.g., original data is copied/written to a new location). With respect to COFW techniques, the COFW occurs only once for each data block modified on the source device. Since only changed data blocks of the source device are retained rather than make a complete copy of the source device, the storage capacity required to implement snapshots may be considerably less than that of the source device. Though a snapshot of a source logical device may be presented to a user as a separate logical device along with the current source logical device, a snapshot of the source logical device is a virtual point in time copy and requires access to the unchanged data in the source logical device. Therefore, failures affecting the source logical device also affect the snapshot of the source logical device. Snapshots of a source logical device may be contrasted, for example, with the physically complete bit-for-bit replicas of the source logical device.

In connection with the foregoing, COFW is only one example of a technology or a technique that may be used in connection with snapshots. More generally, any suitable technique may be used in connection with snapshot creation and techniques described herein. As another example, redirect on Write (ROW) is another technique that may be used in connection with a snapshot implementation. With ROW, after a snapshot is taken, new writes to the primary or source logical device are redirected (written) to a new location.

In at least one embodiment in accordance with techniques herein, the snapshot facility may be TimeFinder® SnapVX™ by Dell Inc. using the COFW or ROW techniques as noted above. With ROW, when a source volume or logical device is written to and the original data of the source volume or logical device needs to be preserved for a snapshot(s), the new write is accepted and asynchronously written to a new location. The source volume now points to the new data while the snapshot(s) continue to point to the original data (e.g., the snapshot delta) in its original location. For example, U.S. patent application Ser. No. 15/969,048, filed May 2, 2018, "Efficient Snapshot Activation", Chandrashekhara et al, Attorney docket No. EMS-691US, which is incorporated by reference herein in its entirety, describes in more detail processing that may be performed in at least one embodiment in connection with establishing or creating a targetless snapshot as well as a linked snapshot (e.g., linked to a logical device identifier), processing performed in connection with servicing I/O operations directed to the snapshot and source logical device, and other processing.

In at least one embodiment, the replication facilities may include remote data replication facilities such as the Symmetrix Remote Data Facility (SRDF®) products provided by Dell Inc. SRDF® is a family of products that facilitates the data replication from one storage array to another through a Storage Area Network (SAN) or and IP network. SRDF® logically pairs a device or a group of devices from each array and replicates data from one to the other synchronously or asynchronously. Generally, the SRDF® products are one example of commercially available products that may be used to provide functionality of a remote data facility (RDF) for use in an embodiment in connection with techniques herein. For a local copy of a LUN or logical device on a first data storage system, SRDF provides for automatically creating and maintaining a remote physical copy on a remote data storage system. The remote copy may be used, for example, in the case of a site disaster of the first data storage system.

Data storage device communication between data storage systems using the SRDF® product is described, for example, in U.S. Pat. Nos. 5,742,792, 5,544,347, and 7,054,883, all of which are incorporated by reference herein. With the SRDF® product, a user may denote a first storage device, such as R1, as a master storage device and a second storage device, such as R2, as a slave storage device. Other incarnations of the SRDF® product may provide a peer to peer relationship between the local and remote storage devices. For example, the host may interact directly with the device R1 of first local data storage system, but any data changes made are automatically provided to the R2 device of a second remote data storage system using the SRDF® product. In operation, the host may read and write data using the R1 volume in the first data storage system, and the SRDF® product may handle the automatic copying and updating of data from R1 to R2 in second remote data storage system. The SRDF® replication functionality may be facilitated with the RAs provided at each of the foregoing first and second data storage systems. Performing remote data communications using the SRDF® product over a TCP/IP network is described in more detail in U.S. Pat. No. 6,968,369, Nov. 22, 2005, Veprinsky, et al., REMOTE DATA FACILITY OVER AN IP NETWORK, which is incorporated by reference herein.

An RDF may be configured to operate in one or more different supported replication modes. For example, such modes may include synchronous mode and asynchronous mode, and possibly other supported modes. When operating in the synchronous mode, the host does not consider a write I/O operation to be complete until the write I/O has been completed on both the first source data storage system and a second remote data storage system. Thus, in the synchronous mode, the first or source storage system will not provide an indication to the host that the write operation is committed or complete until the first storage system receives an acknowledgement from the second data storage system regarding completion or commitment of the write by the second data storage system. In contrast, in connection with the asynchronous mode, the host receives an acknowledgement from the first data storage system as soon as the information is committed to the first data storage system without waiting for an acknowledgement from the second data storage system.

The data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receiving a response (possibly including requested data) in connection such I/O commands.

The data path or I/O path may be contrasted with a control path. The data or I/O path and the control path define two sets of different logical flow paths. The control path, also sometimes referred to as the management path, may be characterized as the path or flow of data management or control commands through a system. For example, the control or management path may be the logical flow through hardware and software components or layers in connection with issuing data storage management commands to and/or from a data storage system, and also receiving responses (possibly including requested data) to such control or management commands. For example, with reference to the FIG. 1, the control commands may be issued from data storage management software, such as the management module 22, or from a data storage system management application executing on a management system, such as another computer system or other device with a processor that is connected to the data storage system 12. Such commands may be, for example, to establish or modify data services; view performance or health of various system components and storage entities; provision storage; perform user account management; provision storage; create, modify or delete a logical storage entity; and the like. For example, commands may be issued over the control path to provision storage for LUNs; create a storage group (SG) which is a logically defined group of one or more LUNs; modify an existing SG such as by adding or removing LUNs; create a snapshot; define conditions of when to create another snapshot; define or establish local and/or remote replication services; define or modify a schedule for snapshot or other data replication services; create or configure a new RAID group; obtain data storage management and configuration information for display in a graphical user interface (GUI) of a data storage management program or application; generally modify one or more aspects of a data storage system configuration; view properties, performance, and/or status information regarding LUNs or other storage objects (e.g., physical and/or logical entities in the data storage system); and the like.

In the following paragraphs and examples provided for illustration of the techniques herein, reference may be made to a particular LSU, such as a LUN denoting a thin or virtually provisioned logical device. However, more generally, the techniques may be used in connection with any suitable LSU that may be supported and used in an embodiment.

In at least one embodiment, a LUN may be a thick or regular LUN in which the physical storage for the full capacity of the LUN may be provisioned when the LUN is created. For a thick LUN, the entire logical address space of the LUN may be mapped to physical storage locations when the LUN is initially created. As a variation in such an embodiment, a LUN may alternatively be a thin LUN or virtually provisioned LUN as noted elsewhere herein. With a thin LUN, the physical storage for the LUN may be allocated in blocks or chunks, such as slices, on demand the first or initial time there is a write to a logical address portion that is mapped to a particular slice. A logical address portion that is mapped to a slice of physical storage may or may not include data stored in the entire logical address portion. Thus, at any point in time, a physical storage slice that is mapped to a logical address portion or subrange of a thin LUN may include data stored on various portions of the slice depending on what particular logical addresses mapped to the slice have been written to. In at least one embodiment, both thick or regular LUNs and thin or virtually provisioned LUNs may be supported and thus configured in the data storage system.

Accordingly, a thin LUN presents a logical storage space to one or more clients, such as applications running on a host, where different portions of the logical storage space may or may not have corresponding physical storage space associated therewith. However, the thin LUN is not mapped directly to physical storage space. Instead, portions of the thin LUN for which physical storage space exists are mapped to data devices, which are logical devices that map logical storage space of the data device to physical storage space on the disk drives or other physical storage devices. Thus, an access of the logical storage space of the thin LUN results in either a null pointer (or equivalent) indicating that no corresponding physical storage space has yet been allocated, or results in a reference to a data device which in turn references the underlying physical storage space.

Thin LUNs and thin provisioning are described in more detail in U.S. patent application Ser. No. 11/726,831, filed Mar. 23, 2007 (U.S. Patent App. Pub. No. 2009/0070541 A1), AUTOMATED INFORMATION LIFE-CYCLE MANAGEMENT WITH THIN PROVISIONING, Yochai, EMS-147US, and U.S. Pat. No. 7,949,637, Issued May 24, 2011, Storage Management for Fine Grained Tiered Storage with Thin Provisioning, to Burke, both of which are incorporated by reference herein.

Referring to FIG. 3, shown is an example of an embodiment of a system that may be utilized in connection with the techniques herein. The example 100 includes a host 102, a switch 140 and a data storage system 120. The host 102 and the data storage system 120 may communicate over one or more paths through the switch 140. The elements 110a-110c denote connections between the host 102 and the switch 140. The elements 112a-112c denote connections between the data storage system 120 and the switch 140. The element 130 may represent a physical device of the data storage system 120 where the physical device 130 may be configured to include 3 LUNs-LUN5, LUN6 and LUN10. It should be noted that the example 100 includes only a single host, single physical device 130 with 3 LUNs, a single data storage system, and a fabric including a single switch for purposes of simplicity to illustrate the techniques herein.

The host 102 may include an application 104, a multi-path (MP) driver 106 and other components 108 whereby element 108 may also include one or more other device drivers and other code. An I/O operation from the application 104 may be communicated to the data storage system 120 using the MP driver 106 and one or more other components represented by element 108. The application 104 may be a database or other application which issues data operations, such as I/O operations, to the data storage system 120. Each of the I/O operations may be directed to a device, such as one of the LUNs of device 130, configured to be accessible to the host 102 over multiple physical paths. As such, each of the I/O operations may be forwarded from the application 104 to the data storage system 120 over one of the possible multiple paths.

The MP driver 106 may include functionality to perform any one or more different types of processing such as related to encryption, multipathing, mirroring, migration, and the like. For example, the MP driver 106 may include multipathing functionality for management and use of multiple paths where, for example, the same set of one of more LUNs may be exposed over the multiple paths. For example, when the host needs to send an I/O directed to a LUN to the data storage system, the MP driver 106 may perform path selection to select one of the possible multiple paths over which the LUN is exposed based on one or more criteria such as load balancing to distribute I/O requests for the LUN or target device across available active paths to the LUN or target device. Load balancing may be performed to provide for better resource utilization and increased performance of the host, data storage system, and network or other connection infrastructure. The MP driver 106 may be included in a commercially available product such as, for example, Dell® EMC PowerPath® software by Dell Inc. The host 102 may also include other components 108 such as one or more other layers of software used in connection with communicating the I/O operation from the host to the data storage system 120. For example, element 108 may include Fibre Channel (FC), SCSI and/or NVMe drivers, a logical volume manager (LVM), and the like. It should be noted that element 108 may include software or other components used when sending an I/O operation from the application 104 where such components include those invoked in the call stack above the MP driver 106 and also below the MP driver 106. For example, application 104 may issue an I/O operation which is communicated in a call stack including an LVM, the MP driver 106, and an FC, SCSI or NVMe driver. This is described in more detail below such as with a subsequent figure.

The data storage system 120 may include one or more physical data storage devices, such as device 130, where each such physical device may be configured to store data of one or more LUNs as described above. Each of the LUNs having data stored on the device 130 may be configured to be accessible to the host through multiple paths. For example, all LUNs of 130 may be accessible using ports of the three front end directors or interfaces 122a-122c, also denoted respectively HA1, HA2 and HA3. The multiple paths allow the application I/Os to be routed over multiple paths and, more generally, allow the LUNs of device 130 to be accessed over multiple paths. In the event that there is a component failure in one of the multiple paths, application I/Os can be easily routed over other alternate paths unaffected by the component failure. Thus, an embodiment of the MP driver 106 may also perform other processing in addition to load balancing in connection with path selection. The MP driver 106 may be aware of, and may monitor, all paths between the host and the LUNs of the device 130 in order to determine that particular state of such paths with respect to the various LUNs. In this manner, the MP driver may determine which of the multiple paths over which a LUN is visible may be used for issuing I/O operations successfully, and to use such information to select a path for host-data storage system communications issued to a particular LUN.

In the example 100, each of the LUNs of the device 130 may be configured as accessible through three paths. Each path may be represented by two path endpoints—a first endpoint on the host 102 and a second endpoint on the data storage system 120. The first endpoint may correspond to a port of a host component, such as a host bus adapter (HBA) of the host 102, and the second endpoint may correspond to a port of a data storage system component, such as a port of an HA of the data storage system 120. In the example 100, elements A1, A2 and A3 each denote a port of a host 102 (e.g., such as a port of an HBA), and elements B1, B2 and B3 each denote a target port of an HA of the data storage system 120. Each of the LUNs of the device 130 may be accessible over three paths—a first path represented by A1-B1, a second path represented by A2-B2 and a third path represented by A3-B3.

Figure 4:
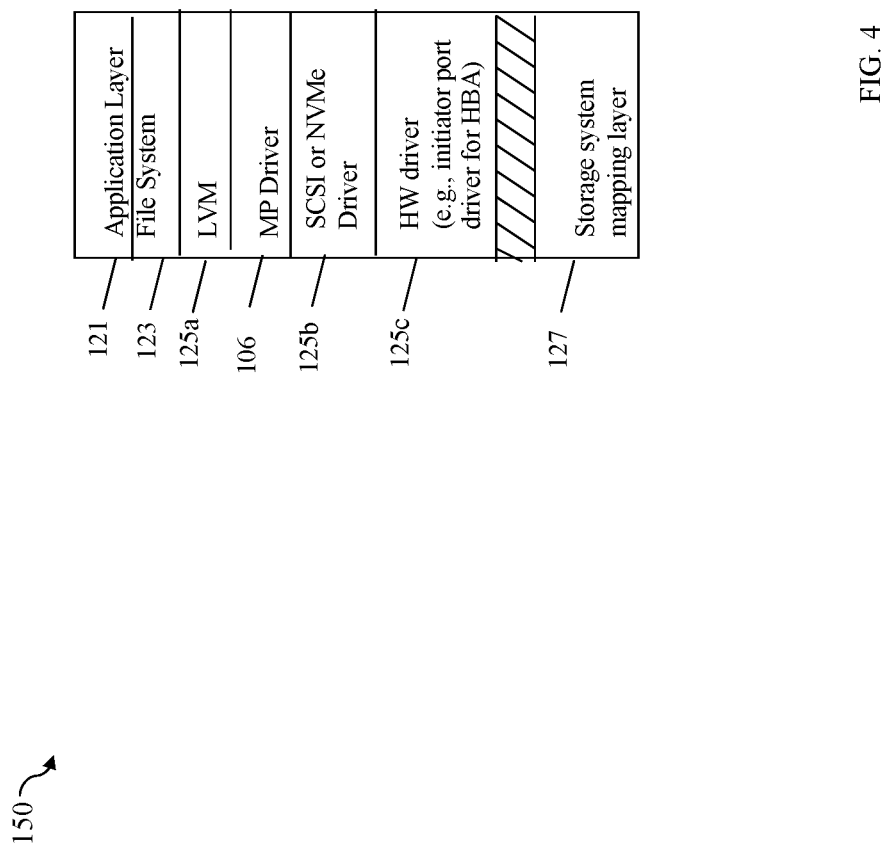
FIG. 4 is an example of a runtime stack associated with the data path or I/O path in an embodiment in accordance with the techniques herein.

Referring to FIG. 4, shown is a representation of a number of mapping layers that may be included in a computer system, such as host 102 of FIG. 3, in combination with a data storage system. FIG. 4 provides further detail regarding various software layers that may be used in connection with the MP driver 106 of FIG. 3.

In an embodiment in accordance with the techniques herein, the data storage system as generally described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

The various software layers of 150 may generally form layers included in the runtime I/O stack, such as when an I/O request is issued by an application on a host to a data storage system. The system includes an application layer 121 which includes application programs executing on the host computer 102. The application layer 121 may refer to storage locations using an associated label or identifier such as a file name or file identifier. Below the application layer 121 is the file system layer 123 and the LVM layer 125a that maps the label or identifier specified by the application layer 121 to a LUN which the host may perceive as corresponding to a physical device address (e.g., the address of one of the disk drives) within the storage system 12. Below the LVM layer 125a may be the MP (multipath) driver 106 which handles processing of the I/O received from layer 125a. The MP driver 106 may include a base driver and one or more driver extension modules. The MP driver 106 may be included in a commercially available product such as Dell® EMC PowerPath® software. Functionality for performing multipathing operations by multipathing software, such as the MP driver 106, may be included in one of the driver extension modules such as a multipath extension module. As described above, the MP driver may perform processing in connection with multiple path management and selecting one of a plurality of possible paths for use in connection with processing I/O operations and communicating with the data storage system, such as 120 of FIG. 3. More generally, one or more layers between the application layer 121 and the MP driver 106 may provide for mapping a LUN (such as used in connection with block-based storage) presented by the data storage system to the host to another logical data storage entity, such as a file, that may be used by the application layer 123. Below the MP driver 106 may be the SCSI or NVMe driver 125b and a hardware (HW) driver 125c. In at least one embodiment the driver 125b may be a SCSI driver that handles processing of a received I/O request from the MP driver 106 such as related to forming a request in accordance with the SCSI standard. As a variation, in at least one embodiment, the driver 125b may be an NVMe driver that handles processing of a received I/O request from the MP driver 106 such as related to forming a request in accordance with the NVMe standard.

At least one embodiment in accordance with the techniques herein may operate in accordance with the NVMe protocol as described, for example, in the NVM Express™ Base Specification, Revision 1_4, Jun. 10, 2019, available at nvmexpress.org/wp-content/uploads/NVM-Express-1_4-2019.06.10-Ratified.pdf. The driver 125c may be a HW driver that facilitates communication with hardware on the host. The driver 125c may be, for example, a driver for an HBA of the host which sends commands or requests to the data storage system and also receives responses and other communications from the data storage system.

In some embodiments, the data storage system 120 may be an intelligent data storage system having its own mapping layer 127 such that the LUN known or exposed to the host may not directly correspond to a physical device such as a disk drive. In such embodiments, the LUN provided by the host in connection with the I/O operation may be further mapped by the data storage system using its mapping layer 127. For example, a LUN provided by the host may be mapped by the data storage system to one or more physical drives, multiple LUNs may be located on a same physical device, multiple physical drives, and the like. In other embodiments, the data storage system may not include such a mapping layer 127.

The MP driver 106, as well as other components illustrated in FIG. 4, may execute in kernel mode or other privileged execution mode. In one embodiment using a Unix-based operating system, the MP driver 106 may execute in kernel mode. In contrast, an application such as represented by application layer 121 may typically execute in user mode, or more generally, a non-privileged execution mode. Furthermore, it will be appreciated by those skilled in the art that the techniques herein may be used in an embodiment having any one of a variety of different suitable operating systems including a Unix-based operating system as mentioned above, any one of the Microsoft Windows® operating systems, a virtualized environment, such as using the VMware™ ESX hypervisor by VMware, Inc, and the like.

In operation, an application executing at application layer 121 may issue one or more I/O operations (e.g., read and write commands or operations) to logical volumes (implemented by the LVM 125a) or files (implemented using the file system 123) whereby such I/O operation may be then mapped to data operations directed to LUNs of the data storage system. Such I/O operations from the application layer 121 may be directed to the MP driver 106 after passing through any intervening layers such as layers 123 and 125a. It should be noted that, in some embodiments, the MP driver 106 may also be below the SCSI or NVMe driver 125b.

In connection with the SCSI standard, a path may be defined between two ports as described above. A command may be sent from the host (as well as a component thereof such as a host bus adapter) and may be characterized as an initiator, originator or source with respect to the foregoing path. The host, as the initiator, sends requests to a data storage system (as well as a particular component thereof such as another HA having a port with a network address) characterized as a target, destination, receiver, or responder. Each physical connection of a path may be between a first endpoint which is a port of the host (e.g., such as of a host bus adapter having ports such as denoted as A1-A3 of FIG. 3) and a second endpoint which is a port of an HA (e.g., such as B1-B3 of FIG. 3) in the data storage system. Over each such path, one or more LUNs may be visible or exposed to the host initiator (or more specifically a host initiator port) through the target port of the data storage system.

In connection with some protocols such as SCSI and NVMe, each path as related to sending and receiving of I/O commands may include 2 endpoints. As discussed herein, the host, or port thereof, may be an initiator with respect to I/Os issued from the host to a target port of the data storage system. In this case, the host and data storage system ports are examples of such endpoints. In connection with the NVMe protocol, communication of I/O operations or other commands may be bidirectional in that either endpoint may act as an initiator and either endpoint may act as a target. In contrast, with other protocols such as the SCSI protocol, communication may be unidirectional in that one of the endpoints, such as the host HBA port, is the initiator and the other endpoint, such as the data storage system target port, is the target receiving the commands from the initiator.

An I/O command or operation, such as a read or write operation, from the host to the data storage system may be directed to a LUN and a logical address or location in the LUN's logical address space. The logical address or location of the LUN may be characterized as the target logical address of the I/O operation. The target logical address or location of the I/O operation may identify a logical block address (LBA) within the defined logical address space of the LUN. The I/O command may include various information such as identify the particular type of I/O command as read or write, identify the target logical address (e.g., LUN and LUN logical address) of the I/O command, and other information. In connection with servicing the I/O operation, the data storage system may map the target logical address to a physical storage location on a PD of the data storage system. The physical storage location may denote the physical storage allocated or provisioned and also mapped to the target logical address.

In at least one embodiment, storage used by an application may be included in a storage group or SG. Typically, each SG includes multiple LUNs. However, more generally as noted above, an SG may be a logically defined group of one or more LUNs.

In at least one existing data storage system, an SG may be initially provisioned or created with an initial size or storage capacity configured from a number of LUNs or logical devices. At a later point in time as the storage capacity of the SG is consumed, it may be necessary to expand the size or storage capacity of the SG. In at least one existing data storage system, the storage capacity expansion of the SG may be performed manually. Such manual storage allocation or provisioning can be time consuming especially for applications which continue to consume additional storage in an ongoing or continuous manner.

Described in the following paragraphs are techniques that may be used in connection with autonomous storage provisioning for SGs used by applications. A user, such as a storage administrator of a data storage system, may selectively identify SGs that are allowed to have their storage capacity expanded autonomously. In at least one embodiment, processing may be performed to create the SG and initially provision storage for the SG. Additionally, during the initial provisioning process when the SG is created, additional information may be specified that may be used in subsequent automatic expansion of the SG without any further user interaction. The additional information may be user-specified information. The additional information may include a trigger condition identifying when to perform SG expansion. The additional information may include an expansion or growth value specifying how much to expand or grow the SG capacity upon the occurrence of the trigger condition. The additional information may include a condition identifying an upper bound or system-wide maximum capacity limit whereby an SG's capacity is not expanded if doing so would result in exceeding the system-wide maximum capacity limit.

The additional information used in connection with automatic expansion of an SG may be expressed in the form of rules. A rules engine may be utilized where the rules define the conditions used in connection with autonomous expansion or growth of an SG. The rules engine may implement or enforce the rules associated with a particular SG. The rules engine may monitor the SG over time in accordance with the rules to determine under what condition(s) to expand the storage capacity provisioned for the SG, to determine how much to expand the SG's storage capacity upon the occurrence of such a condition, and to determine under what condition(s) automated expansion of an SG's storage capacity may not occur.

In at least one embodiment, a user may selectively tag one or more SGs for which autonomous storage provisioning to expand storage capacity is performed. The particular SGs tagged may have autonomous storage provisioning enabled to subsequently automatically expand storage capacity as needed based on defined rules for the SGs. The remaining SGs not tagged may have autonomous storage provisioning disabled whereby storage capacity expansion for the disabled SGs is not performed automatically. In at least one embodiment, the SGs tagged to enable autonomous storage provisioning may be deemed critical or important data used by critical or important applications. In contrast, in such an embodiment, the SGs for which autonomous storage provisioning is disabled may be less critical or important in comparison to those SGs for which autonomous storage provisioning is enabled.

In at least one embodiment, the SGs tagged to enable autonomous storage provisioning may be used by first applications deemed more critical or important in contrast to second applications that use other SGs for which autonomous storage provisioning is disabled.

In at least one embodiment, the techniques described herein for autonomous storage provisioning provides for only initially provisioning storage for an SG. Subsequently, storage may be automatically provisioned for the SG based on specified conditions in the form of rules and based on automated monitoring of the state of the SG.

As an example, SG "ABC" may be initially provisioned with 1 TB (terabyte) of storage capacity. Additionally, rules may be specified for the SG where a first rule may specify a trigger condition of when to automatically increase the SG's capacity. For example, the first rule may specify to increase the SG's capacity automatically when 75% of the SG's existing capacity is consumed. The 75% may be a specified threshold condition that is customer or user defined such as part of the initial provisioning process. As a variation, the threshold amount of storage consumed of the first rule may be specified as an integer or numeric value (e.g., 500 GB, 1 TB) denoting an amount of storage rather than a percentage with respect to the existing current storage capacity or initial storage capacity. Additionally, a second rule may specify the amount of storage capacity growth or expansion denoting an amount of storage added to the SG in response to the condition of the first rule occurring. For example, the second rule may specify to add 50% of the current storage capacity of the SG. As a variation, the amount of storage capacity growth or expansion may be specified as an integer or numeric value (e.g., 500 GB, 1 TB) denoting an amount of storage rather than a percentage with respect to the existing current storage capacity or initial storage capacity. To further illustrate, consider the SG ABC with an initial storage capacity of 1 TB. The first rule may indicate to expand SG ABC's capacity when 75% or 750 GBs of its capacity are used. When 750 GBs of SG ABC's capacity is consumed (as denoted by the first rule), the second rule may indicate to increase SG ABC's storage capacity by an additional 500 GB or 50% of its current capacity. Additionally, a third rule may indicate not to further expand any SG's capacity if the system-wide consumed capacity would exceed a specified maximum, such as 75% of the total capacity of all PDs in the data storage system. In this manner, the third rule provides a system-wide upper bound or capacity limit on automatic expansion of SGs. In at least one embodiment, if implementing an automatic expansion of an SG's storage capacity would exceed the system-wide maximum capacity limit, the automatic expansion is not performed and an alert, warning, error, or other condition may be generated to notify the storage administrator. In response, for example, the storage administrator may take an appropriate action such as, for example, add more physical storage devices to the system to increase the total system storage capacity.

In at least one embodiment, the techniques herein may be used to specify an initial amount of storage allocation for an SG. Subsequently, the autonomous provisioning techniques herein may be used to further automatically expand the SG's storage capacity and allocate storage for the SG as may be needed over time as the application using the SG needs such additional storage.

The foregoing and other aspects of the techniques herein are described in more detail in the following paragraphs.

In at least one embodiment, processing may be performed to create an SG. Creating the SG may be include initially provisioning and configuring the SG with an initial storage capacity configured from a number of LUNs or logical devices. The creation of the SG may be performed, for example, using a GUI with a wizard or guided dialog during which a user makes selections to create and configure the SG.

The processing to create the SG may include, for example, specifying which external clients or hosts are allowed to access the LUNs of the SG. For example, in connection with the SCSI standard in one embodiment, creating the SG may include identifying the hosts or initiators of the host allowed to access the LUNs of the SG.

The processing to create the SG may include, for example, specifying which target ports of the data storage system over which the LUNs of the SG are exposed to external clients, such as the hosts or host initiators.

The processing to create the SG may include, for example, specifying a local replication policy for the LUNs of the SG. For example, the local replication policy for an SG may indicate to create a snapshot of each LUN of the SG at particular time intervals and may indicate a maximum number of snapshots of each LUN to retain. The local replication policy may also include other information relevant to the particular local replication facility that may vary with embodiment.

The processing to create the SG may include, for example, specifying a remote replication policy for the LUNs of the SG. For example, the remote replication policy for an SG may configure the remote counterpart LUNs for the LUNs in the SG for synchronous replication, may configure the remote counterpart LUNs for the LUNs in the SG for asynchronous replication, and may identify the remote data storage system(s) on which to create and maintain the remote counterpart LUNs for the LUNs of the SG. The remote replication policy may also include other information relevant to the particular remote replication facility, which may vary with embodiments.

In at least one embodiment, the processing to create the SG may also include specifying whether to enable or disable autonomous provisioning to automatically expand the storage capacity of the SG.

In at least one embodiment, the processing to create the SG may also include providing additional information used in connection with autonomous provisioning to automatically expand the storage capacity of the SG. Consistent with other discussion herein, the additional information may be used to define rules that are implemented or enforced using a rules engine. In at least one embodiment, rules may also be defined, implemented and enforced using the rules engine for the local replication policy, the remote replication policy, and other suitable conditions associated with an SG.

The additional information used in connection with autonomous provisioning to automatically expand the storage capacity of the SG may be user configured or specified. In at least one embodiment, default values may be specified that may be further modified or configured by a user. Additionally, an embodiment may allow the additional information used in connection with autonomous provisioning for an SG to be initially specified when creating the SG, and then may further allow the additional information to be subsequently modified by a user.

In at least one embodiment, the processing to create the SG may also include specifying whether to enable or disable autonomous provisioning to automatically expand the storage capacity of the SG. Additionally, an embodiment may also allow for further resetting or modifying the current setting between enable and disable at subsequent points of time to, respectively, enable or disable autonomous provisioning to automatically expand the storage capacity of the SG.

In at least one embodiment, the additional information used in connection with autonomous provisioning to automatically expand the storage capacity of the SG may include values for the following parameters:

Parameter 1. A high-water mark triggering expansion or increasing the storage capacity of the SG. The high-water mark may denote a threshold condition or amount of storage consumed of the SG and indicate to automatically increase the SG's storage capacity when the amount of consumed storage capacity of the SG reaches the high-water mark. Thus, the high-water mark denoting consume capacity of the SG may be used in the first rule to specify a trigger condition of when to automatically increase the SG's capacity. For example, the high-water mark may be a percentage, such as 75%, indicating to increase the SG's capacity automatically when 75% of the SG's existing capacity is consumed. As a variation, the high-water mark or threshold amount of storage consumed of the first rule may be specified as an integer or numeric value (e.g., 500 GB, 1 TB) denoting an amount of storage rather than a percentage with respect to the current existing storage capacity or initial storage capacity. If the SG's consumed capacity reaches the high-water mark, then the SG's storage capacity may be increased or expanded by an amount specified by the parameter 2 below. Additionally, the SG's storage capacity may be increased and configured among one or more new LUNs or logical devices added to the SG.

Parameter 2. The amount of storage capacity growth or expansion denoting an amount of storage added to the SG in response to the condition of the first rule (using the parameter 1) occurring. The second rule may specify parameter 2, the amount of storage capacity growth or expansion denoting an amount of storage added to the SG in response to the condition of the first rule occurring. For example, the second rule, and thus parameter 2, may specify to add 50% of the current storage capacity of the SG. As a variation, the amount of storage capacity growth or expansion may be specified as an integer or numeric value (e.g., 500 GB, 1 TB) denoting an amount of storage rather than a percentage with respect to the current existing storage capacity or initial storage capacity. In at least one embodiment, the amount of storage capacity added or expanded to the SG may be partitioned among M LUNs, wherein M is a positive integer value. In at least one embodiment, the amount of the storage capacity growth or expansions denoted by the parameter 2 may be equally divided among the M LUNs. As a variation, the amount of storage capacity growth or expansion of the SG may be partitioned unevenly among M multiple LUNs added.

Parameter 3. A system-wide storage capacity high-water mark denoting a maximum amount of consumed system-wide capacity. The parameter 3 high-water mark pertains to the consumed BE physical storage on the data storage system. The third rule may embody parameter 3 and may indicate not to further expand any SG's capacity if the system-wide consumed capacity would exceed a specified maximum or high-water mark denoted by parameter 3. For example, parameter 3 may be a percentage, such as 75% thereby denoting 75% of the total storage capacity of all BE PDs in the data storage system. As a variation, the system-wide storage capacity high-water mark of the third rule may be specified as an integer or numeric value (e.g., 500 GB, 1 TB) denoting an amount of storage rather than a percentage with respect to the existing storage capacity of all BE PDs in the system. In this manner, the third rule provides a system-wide upper bound or capacity limit on automatic expansion of SGs. In at least one embodiment, if implementing an automatic expansion of an SG's storage capacity would exceed the system-wide maximum capacity limit, the automatic expansion is not performed and an alert, warning, error, or other condition may be generated to notify the storage administrator. In response, for example, the storage administrator may take an appropriate action such as, for example, add more physical storage devices to the system to increase the total system storage capacity. Thus, parameter 3 may be used as a safety to provide assurance that BE storage capacity is not provisioned beyond the system-wide storage capacity high-water mark.

In at least one embodiment, rules may be defined based on the 3 parameters as noted above. Additionally, a fourth rule may be defined that specifies to utilize the existing local replication policy to protect and configure any newly added LUNs or logical devices added as a result of the autonomous provisioning techniques herein to expand an SG. Thus, any newly added LUNs are protected in accordance with the existing local replication policy. Additionally, a fifth rule may be defined that specifies to utilize the existing remote replication policy to protect and configure any newly added LUNs or logical devices added as a result of the autonomous provisioning techniques herein to expand an SG. Thus, any newly added LUNs are protected in accordance with the existing remote replication policy.

As an example, consider an SG X initially configured to be 2 TBs with parameter 1=80%, parameter 2=50% and parameter 3=75%. In this case, SG X may be automatically expanded to add 1 TB (e.g., 50% of 2 TB denoted by parameter 2) in response to 80% of SG X's storage capacity, or 1.6 TBs of SG X being consumed. However, based on parameter 3, no additional storage is provisioned for SG X if performing the additional provisioning results in the system-wide BE storage consumption exceeding 75% of the storage capacity of the BE PDs of the data storage system. In this example, assume that the high-water mark of parameter 3 is not reached so that SG X is automatically expanded to add 1 TB of storage capacity bringing the revised total storage capacity for SG X to 3 TB. In at least one embodiment, the 1 TB of storage capacity added to SG X may be configured by adding M new LUNs to SG X. In at least one embodiment, each of the M LUNs may have the same storage capacity. For example, if M=2, each LUN may be 500 GBs to obtain the additional 1 TB of expanded storage capacity for SG X. In at least one embodiment, the system may automatically determine M and the storage capacity of each of the M added LUNs using any suitable technique. Additionally, each of the M LUNs added to the SG X may be configured to have local replication and remote replication in accordance with defined replication policies for the SG. In other words, each of the M LUNs added to the SG X may be configured for local replication and remote replication in a manner similar to other existing LUNs of the SG X.

In at least one embodiment, processing may be performed to track the increases in SG storage capacities due to the autonomous provisioning enabled for selected SGs. The increases in SG storage capacities denoting the storage allocated due to the autonomous provisioning enabled for selected SGs may be tracked for a time period, such as weekly, and reported to a storage administrator or other suitable user. Such reports may be used by the storage administrator or other user to provide an insight regarding the storage consumption amounts and rates across the entire system and particular SGs. Such reports may be used, for example, in connection with capacity planning for the system to determine appropriate amounts of BE PD storage to purchase for the system.

Figure 5:
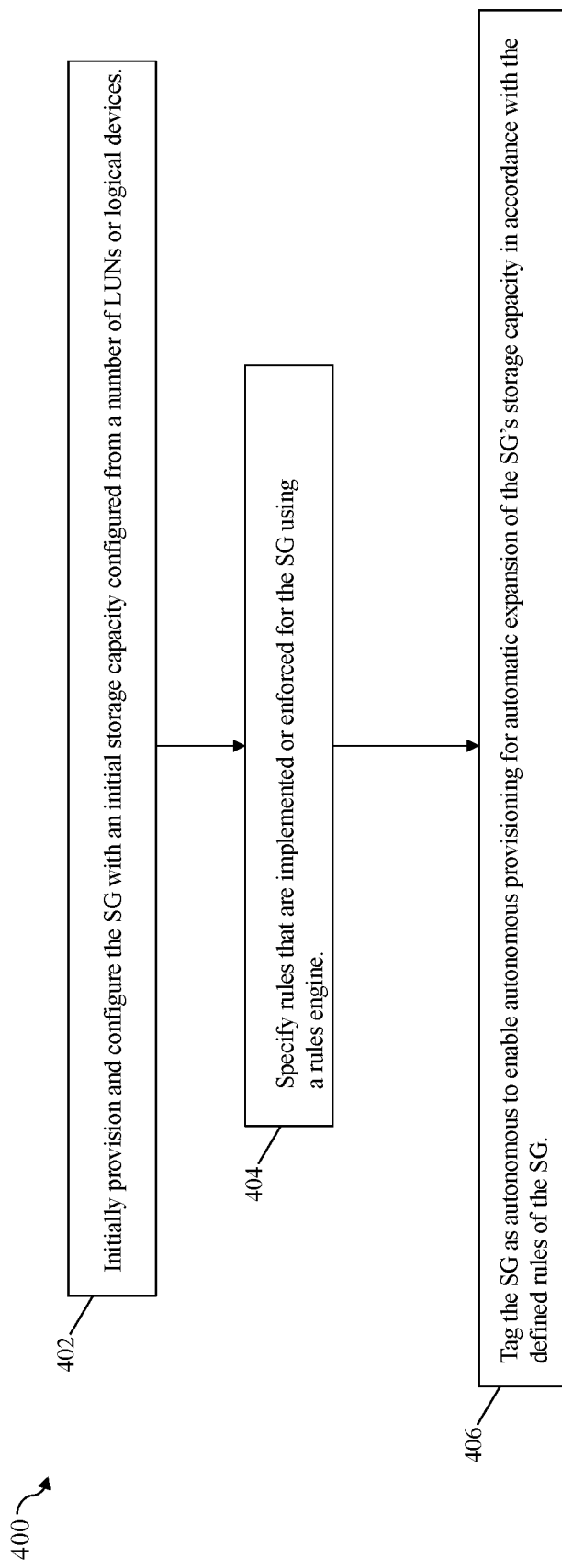
FIGS. 5 and 6 are flowcharts of processing steps that may be performed in an embodiment in accordance with the techniques herein.

Referring to FIG. 5, shown is a first flowchart 400 of processing that may be performed in an embodiment in accordance with the techniques herein.

At the step 402, processing may be performed to initially provision and configure the SG with an initial storage capacity configured from a number of LUNs or logical devices. From the step 402, control proceeds to the step 404.

At the step 404, rules may be specified that are implemented or enforced for the SG using a rules engine. The rules defined in the step 404 may include rules based on user specified or configurable parameters 1-3 for the SG as described above. The rules defined in the step 404 may also include rules based on any existing local and/or remote replication policies specified for the SG. Generally, the rules may be used in connection with autonomous provisioning for the SG providing for automatic expansion or growth of the SG. From the step 404, control proceeds to the step 406.

At the step 406, processing may be performed to tag the SG as autonomous to enable autonomous provisioning for automatic expansion of the SG's storage capacity in accordance with the defined rules of the SG. The rules may be those as specified in the step 404.

Figure 6:
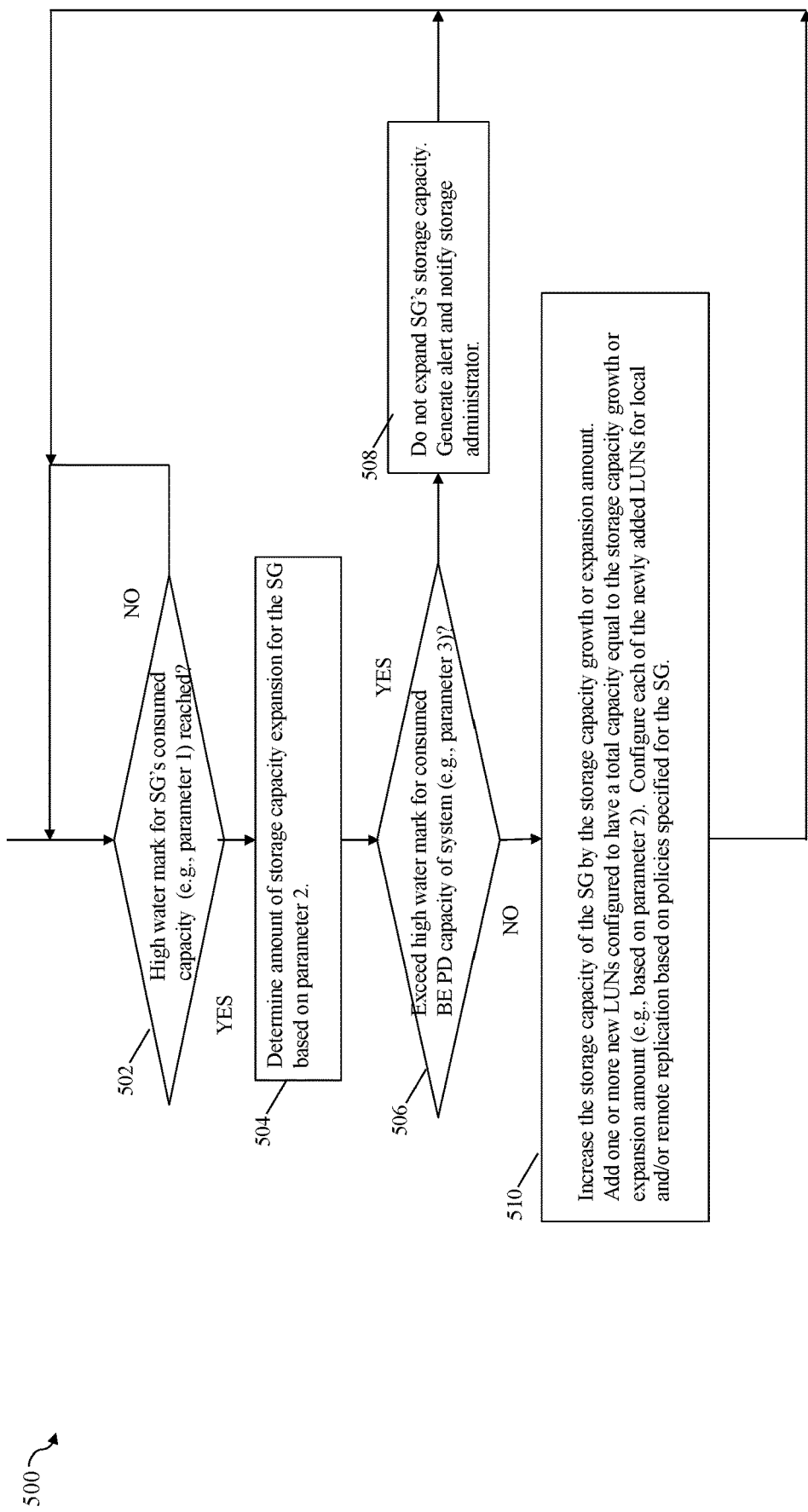

Referring to FIG. 6, shown is a first flowchart 500 of processing that may be performed in an embodiment in accordance with the techniques herein. The flowchart 500 may be performed by the rules engine in connection with enforcing the rules for the SG. The flowchart 500 may be performed for an SG after performing the processing of FIG. 5 for the SG.

At the step 502, a determination is made for the SG whether the high-water mark for the SG's consumed capacity (e.g., parameter 1 for the SG) has been reached. Control remains at the step 502 until the step 502 evaluates to yes. In response to the step 502 evaluating to yes or true, control proceeds to the step 504.

At the step 504, processing may be performed to determine the amount of storage capacity expansion for the SG based on parameter 2 specified for the SG. From the step 504, control proceeds to the step 506.

At the step 506, processing is performed to determine whether allocating the additional amount of storage capacity determined in the step 604 for the SG results in exceeding the high-water mark of consumed BE PD storage capacity of the data storage system (e.g., parameter 3 for the SG). If the step 506 evaluates to yes, control proceeds to the step 508.

At the step 508, the SG's storage capacity is not expanded. The step 508 may include generating an alert to notify the storage administrator that the automated provisioning failed due to the system-wide BE PD storage capacity high-water mark being exceeded if the SG's storage capacity is expanded. In response, the storage administrator may perform one or more actions such as, for example, add additional BE PDs to the system. From the step 508, control proceeds to the step 503

If the step 506 evaluates to no, control proceeds to the step 510. At the step 510, processing may be performed to increase the storage capacity of the SG by the storage capacity growth or expansion amount (e.g., as determined in the step 504). The step 510 may include adding one or more new LUNs to the SG, where the one or more new LUNs are configured to have a total capacity equal to the storage capacity growth or expansion amount (e.g., based on parameter 2 and as determined in the step 504). Additionally, the step 510 may include configuring each of the newly added LUNs for local and/or remote replication based on policies specified for the SG. From the step 510, control proceeds to the step 502.

The techniques herein may be performed using any suitable hardware, firmware, software and/or other computer-implemented modules or devices having the described features and performing the described functions. For example, techniques herein may be performed by executing code which is stored on any one or more different forms of computer-readable media, where the code may be executed by one or more processors, for example, such as processors of a computer or other system, an ASIC (application specific integrated circuit), and the like. Computer-readable media may be non-transitory and may include different forms of volatile (e.g., RAM) and non-volatile (e.g., ROM, flash memory, magnetic or optical disks, or tape) storage which may be removable or non-removable. Embodiments of the techniques described herein may be used in connection with any appropriate operating system.

While the invention has been disclosed in connection with embodiments shown and described in detail, their modifications and improvements thereon will become readily apparent to those skilled in the art. Accordingly, the spirit and scope of the present invention should be limited only by the following claims.

What is claimed is:

1. A computer-implemented method of provisioning storage comprising:
    initially provisioning storage for a storage group of logical devices;
    tagging the storage group to enable autonomous storage provisioning for the storage group;
    receiving a plurality of parameters used in connection with performing autonomous storage provisioning for the storage group, wherein the plurality of parameters includes a first parameter denoting a threshold amount of consumed storage of the storage group, and a second parameter denoting a system-wide threshold of consumed backend non-volatile storage;
    determining, in accordance with the plurality of parameters, whether to expand a current storage capacity of the storage group; and
    responsive to determining to expand the current storage capacity of the storage group, performing first processing to automatically expand the current storage capacity of the storage group.

2. The computer-implemented method of claim 1, further comprising:
    determining whether the current amount of consumed storage of the storage group exceeds the threshold amount of consumed storage denoted by the first parameter; and
    responsive to determining the current amount of consumed storage of the storage group does not exceed the threshold amount of consumed storage denoted by the first parameter, determining not to expand the current storage capacity of the storage group.

3. The computer-implemented method of claim 2, wherein responsive to determining the current amount of consumed storage of the storage group does exceed the threshold amount of consumed storage denoted by the first parameter, second processing is performed, wherein the second processing includes:
    determining a second amount by which to increase the current storage capacity of the storage group;
    determining whether allocating the second amount of storage capacity results in a current amount of consumed backend non-volatile storage exceeding the system-wide threshold of consumed backend non-volatile storage denoted by the second parameter; and
    responsive to determining that allocating the second amount of storage capacity results in the current amount of consumed backend non-volatile storage exceeding the system-wide threshold of consumed backend non-volatile storage denoted by the second parameter, determining not to expand the current storage capacity of the storage group.

4. The computer-implemented method of claim 3, further comprising:
    responsive to determining that allocating the second amount of storage capacity does not result in the current amount of consumed backend non-volatile storage exceeding the system-wide threshold of consumed backend non-volatile storage denoted by the second parameter, determining to expand the current storage capacity of the storage group.

5. The computer-implemented method of claim 1, wherein the first parameter is expressed using a percentage value denoting a percentage of the current storage capacity of the storage group.

6. The computer-implemented method of claim 1, wherein the first parameter is expressed as an integer or numeric value denoting an amount of storage.

7. The computer-implemented method of claim 1, wherein the second parameter is expressed as a percentage value denoting a percentage of a current back end non-volatile storage capacity in a data storage system including the storage group.

8. The computer-implemented method of claim 1, wherein the storage group is one of a plurality of storage groups in a data storage system and wherein a selected portion of the plurality of storage groups are tagged to enable autonomous storage provisioning for the selected portion of the plurality of storage groups.

9. The computer-implemented method of claim 8, wherein a second storage group of the plurality of storage groups not included in the selected portion is not tagged whereby autonomous storage provisioning is disabled for the second storage group, and wherein the second storage group includes data that is not as important or critical as other data of the storage group.

10. The computer-implemented method of claim 9, wherein the storage group includes data used by a first application and the second storage group includes data used by a second application, and wherein the first application is more important or critical than the second application.

11. A system comprising:
   at least one processor; and
   at least one memory comprising code stored thereon that, when executed, performs a method of provisioning storage comprising:
      initially provisioning storage for a storage group of logical devices;
      tagging the storage group to enable autonomous storage provisioning for the storage group;
      receiving a plurality of parameters used in connection with performing autonomous storage provisioning for the storage group, wherein the plurality of parameters includes a first parameter denoting a threshold amount of consumed storage of the storage group, and a second parameter denoting a system-wide threshold of consumed backend non-volatile storage;
      determining, in accordance with the plurality of parameters, whether to expand a current storage capacity of the storage group; and
      responsive to determining to expand the current storage capacity of the storage group, performing first processing to automatically expand the current storage capacity of the storage group.

12. A non-transitory computer-readable medium comprising code stored thereon that, when executed, performs a method of provisioning storage comprising:
   initially provisioning storage for a storage group of logical devices;
   tagging the storage group to enable autonomous storage provisioning for the storage group;
   receiving a plurality of parameters used in connection with performing autonomous storage provisioning for the storage group, wherein the plurality of parameters includes a first parameter denoting a threshold amount of consumed storage of the storage group, and a second parameter denoting a system-wide threshold of consumed backend non-volatile storage;
   determining, in accordance with the plurality of parameters, whether to expand a current storage capacity of the storage group; and
   responsive to determining to expand the current storage capacity of the storage group, performing first processing to automatically expand the current storage capacity of the storage group.

13. The non-transitory computer-readable medium of claim 12, further comprising:
   determining whether the current amount of consumed storage of the storage group exceeds the threshold amount of consumed storage denoted by the first parameter; and
   responsive to determining the current amount of consumed storage of the storage group does not exceed the threshold amount of consumed storage denoted by the first parameter, determining not to expand the current storage capacity of the storage group.

14. The non-transitory computer-readable medium of claim 13, wherein responsive to determining the current amount of consumed storage of the storage group does exceed the threshold amount of consumed storage denoted by the first parameter, second processing is performed, wherein the second processing includes:
   determining a second amount by which to increase the current storage capacity of the storage group;
   determining whether allocating the second amount of storage capacity results in a current amount of consumed backend non-volatile storage exceeding the system-wide threshold of consumed backend non-volatile storage denoted by the second parameter; and
   responsive to determining that allocating the second amount of storage capacity results in the current amount of consumed backend non-volatile storage exceeding the system-wide threshold of consumed backend non-volatile storage denoted by the second parameter, determining not to expand the current storage capacity of the storage group.

15. The non-transitory computer-readable medium of claim 14, further comprising:
   responsive to determining that allocating the second amount of storage capacity does not result in the current amount of consumed backend non-volatile storage exceeding the system-wide threshold of consumed backend non-volatile storage denoted by the second parameter, determining to expand the current storage capacity of the storage group.

\* \* \* \* \*